United States Patent [19]

Deutsch et al.

[11] Patent Number: 4,936,277
[45] Date of Patent: Jun. 26, 1990

[54] SYSTEM FOR MONITORING AND/OR CONTROLLING MULTIPLE CYLINDER ENGINE PERFORMANCE

[75] Inventors: Robert W. Deutsch, Sugar Grove; David O. Potter, Lake Villa, both of Ill.

[73] Assignee: Motorola, Inc., Schaumburg, Ill.

[21] Appl. No.: 286,684

[22] Filed: Dec. 19, 1988

[51] Int. Cl.⁵ .............................................. F02D 41/04
[52] U.S. Cl. ..................................... 123/436; 123/476
[58] Field of Search ............... 123/414, 419, 425, 435, 123/436, 476; 364/431.05, 431.08

[56] References Cited

U.S. PATENT DOCUMENTS

| | | | |
|---|---|---|---|
| 3,903,856 | 9/1975 | McDougal et al. | 123/425 |
| 4,116,173 | 9/1978 | McDougal et al. | 123/425 |
| 4,357,662 | 11/1982 | Schira et al. | 123/436 X |
| 4,378,004 | 3/1983 | Petrie | 123/643 |
| 4,380,800 | 4/1983 | Wilkinson | 123/436 X |
| 4,385,605 | 5/1983 | Petrie et al. | 123/414 |
| 4,471,737 | 9/1984 | McDougal et al. | 123/425 |
| 4,475,511 | 10/1984 | Johnson et al. | 123/436 |
| 4,476,833 | 10/1984 | Johnson et al. | 123/436 |
| 4,495,920 | 1/1985 | Matsumura et al. | 123/436 |
| 4,553,426 | 11/1985 | Capurka | 73/116 |
| 4,628,269 | 12/1986 | Hunninghaus et al. | 328/120 |
| 4,697,561 | 10/1987 | Citron | 123/436 X |
| 4,766,863 | 8/1988 | Fujimori | 123/436 X |
| 4,782,809 | 11/1988 | Kotowski et al. | 123/531 |

OTHER PUBLICATIONS

IEEE Article "A Real-Time Microprocessor-Based System for Engine Deficiency Analysis", by Sood et al., vol. IE-30, No. 2, May 1983, pp. 159-163.
IEEE Article "Statistical Methods for Engine Fault Diagnosis", by Sood et al., 84/0000-0051, 7-1984, pp. 51-57.
SAE Article "Computerized Knock Detection from Engine Pressure Records", by Checkel et al., 860028, Feb. 24-28, 1986, pp. 1-11.

*Primary Examiner*—Willis R. Wolfe
*Attorney, Agent, or Firm*—Phillip H. Melamed

[57] ABSTRACT

Engine crankshaft speed signal, comprising pulses produced by a toothed wheel and sensor, has portions monitored to develop separate instantaneous cylinder associated power output vector signals for each engine cylinder. Engine knock is detected by comparing actual variations in each cylinder power signal with expected variations. Each vector cylinder power signal is multiplied by different first and second weighting vector signals to provide first and second scalar signals indicative of cylinder performance with respect to first and second different cylinder performance criteria, respectively. These scaler signals are compared to each other and a balancing of cylinder power is achieved by adjusting the amount of fuel delivered to each individual cylinder. Preferably, fuel adjustment is implemented such that the average fuel delivered to the cylinders prior to adjustment, determined in accordance with exhaust pollution level, will equal the average fuel delivered after adjustment. Knock detection is provided without using any additionall knock sensor since the existing crankshaft speed sensor signal is used. The generated individual cylinder power vector signals, by use of different weighting vectors, allow detection of several different faults or other performance criteria for each cylinder. Balancing cylinder power is achieved while fuel consumption is maintained in accordance with desired exhaust pollution levels.

22 Claims, 6 Drawing Sheets

SYSTEM FOR MONITORING AND/OR CONTROLLING MULTIPLE CYLINDER ENGINE PERFORMANCE

BACKGROUND OF THE INVENTION

The invention relates generally to the field of systems which monitor and/or control multiple cylinder engine performance.

It is known that detection of engine knock is desirable such that engine operating parameters can be adjusted to avoid such a condition. Generally, knock detection is accomplished in accordance with the output of one or more special sensors designed specifically to detect engine knock. Some of these sensors detect knock by virtue of detecting audible knock sounds or vibrations produced by the engine in a single sensor. Other knock sensors detect abnormal engine cylinder pressure variations in each cylinder. Providing one or more additional knock sensors to an engine system results in increasing the complexity and cost of such engine monitoring/control systems.

Some prior systems have proposed that a specific type of engine cylinder failure can be detected by detailed analysis of the instantaneous engine crankshaft speed signal produced in response to each cylinder's power cycle. In such systems, apparently a certain portion of the engine crankshaft speed signal is monitored during an associated power cycle of each cylinder to create an instantaneous cylinder associated speed vector signal By comparing the variations produced in the speed vector signals to some type of reference criteria an indication of a single fault, such as engine misfire, can be achieved. However, these systems do not discuss how it is possible to use such a system to determine engine knock or any other type of engine cylinder fault or undesired engine cylinder performance.

One prior engine control system recognized that it is desirable to adjust fuel to individual engine cylinders so as to obtain power balancing between these cylinders such that each cylinder contributes approximately the same power with respect to driving the engine crankshaft. In this system, the engine crankshaft speed was measured at a certain position of each cylinder power cycle during an engine idle speed mode. The measured crankshaft speed was then compared with the known desired engine idle speed, and fuel to each of the cylinders was adjusted in an attempt to have each engine cylinder achieve the same desired idle speed crankshaft speed at the power cycle position at which the crankshaft speed was measured. Such a system which uses a known desired engine speed would apparently not be usable at conditions other than the engine idle speed mode where the desired crankshaft speed was known. Also, in such a system the balancing of individual cylinder power might run contrary to other engine performance criteria, such as maintaining the average amount of fuel consumed at a predetermined level to reduce engine pollutants in the exhaust. Thus, the functions of maintaining engine exhaust pollutants below a maximum permissible level and implementing balanced engine cylinder power might not be readily achieved in the prior system.

SUMMARY OF THE INVENTION

An object of the present invention is to provide an improved system for monitoring and/or controlling multiple cylinder engine performance which overcomes one or more of the above-noted deficiencies of prior engine systems.

In accordance with one feature of the present invention, individual cylinder-associated power signals are generated. These signals are then multiplied by various different weighting factors, preferably by a microprocessor, such that different cylinder-associated product signals are produced in association with each of the individual cylinders. By comparing the individual cylinder-associated product signals produced in accordance with a first weighting factor to some reference level, each cylinder's performance with respect to a first performance criteria, such as whether or not engine knock is present, could be determined. The use of these same individual cylinder power signals multiplied by a second weighting factor can produce product signals which, when compared with a different reference level, can determine whether or not each engine cylinder's performance is satisfactory with respect to a second performance criteria such as the generation of equal power or torque to be transferred to the engine crankshaft, or if there is a misfire in any engine cylinder or if any engine cylinder has insufficient compression. Thus, by merely utilizing different weighting factors for multiplying the individual cylinder-associated power signals, a plurality of different performance and fault criteria can be established for monitoring the operation of each of the engine cylinders. Preferably the cylinder power signals are vector signals which vary over the cylinder power cycle, the weighting factors comprise weighting vector signals, and the product signals comprise scalar signals.

In accordance with another feature of the present invention, the individual cylinder-associated power signals are compared to each other so as to determine if there is a power mismatch between the power produced by each of the engine cylinders. To achieve cylinder power balancing, the amount of fuel being delivered to the individual cylinders is then adjusted to obtain cylinder power balancing. This is readily achievable regardless of whether or not the engine is operating in the idle speed mode since the engine cylinder power signals are compared against each other rather than against any predetermined reference level.

According to another feature of the present invention, individual cylinder power associated signals are used to adjust cylinder power balance by adjusting the amount of fuel delivered to each of the cylinders in accordance with such power signals. However, a maintaining means is provided which insures that the average amount of fuel delivered to all of the cylinders prior to a cylinder power balancing adjustment is essentially the same as the average fuel provided to the cylinders after the cylinder power balancing adjustment. In this manner, if the average amount of fuel to the cylinders is controlled in accordance with a predetermined desired engine criteria, such as maintaining the level of sensed oxygen in the engine exhaust at or below or above a certain level, engine cylinder power balancing can be achieved either without disturbing this criteria or at least taking this criteria into account when determining the power balancing adjustment.

An additional aspect of the present invention involves detecting engine cylinder knock without the use of any specifically-designated engine knock sensor. According to this aspect of the present invention, the pulses of the engine crankshaft speed signal are utilized and predetermined portions of this speed signal are monitored in association with and during expected power cycles of each of the engine cylinders and prior to the next expected engine cylinder power cycle. The variations in the monitored portions of the engine speed signal are then effectively compared with expected variations of such a signal which would be produced when knock is present. In response to this comparison, an engine knock indicative signal is produced. More specifically, the time durations between pulses produced by a toothed wheel, rotated by the engine crankshaft, and an associated toothed wheel sensor are monitored. Variations in these between pulse durations are utilized to determine if engine knock is present in any of the engine cylinders.

All of the above features of the present invention can be better understood by reference to the following more-detailed description of the present invention which illustrates the structure and additional advantages of the present invention.

BRIEF DESCRIPTION OF THE DRAWINGS

For a more complete understanding of the present invention, reference should be made to the drawings, in which.

DESCRIPTION OF THE PREFERRED EMBODIMENT

Figure 1:
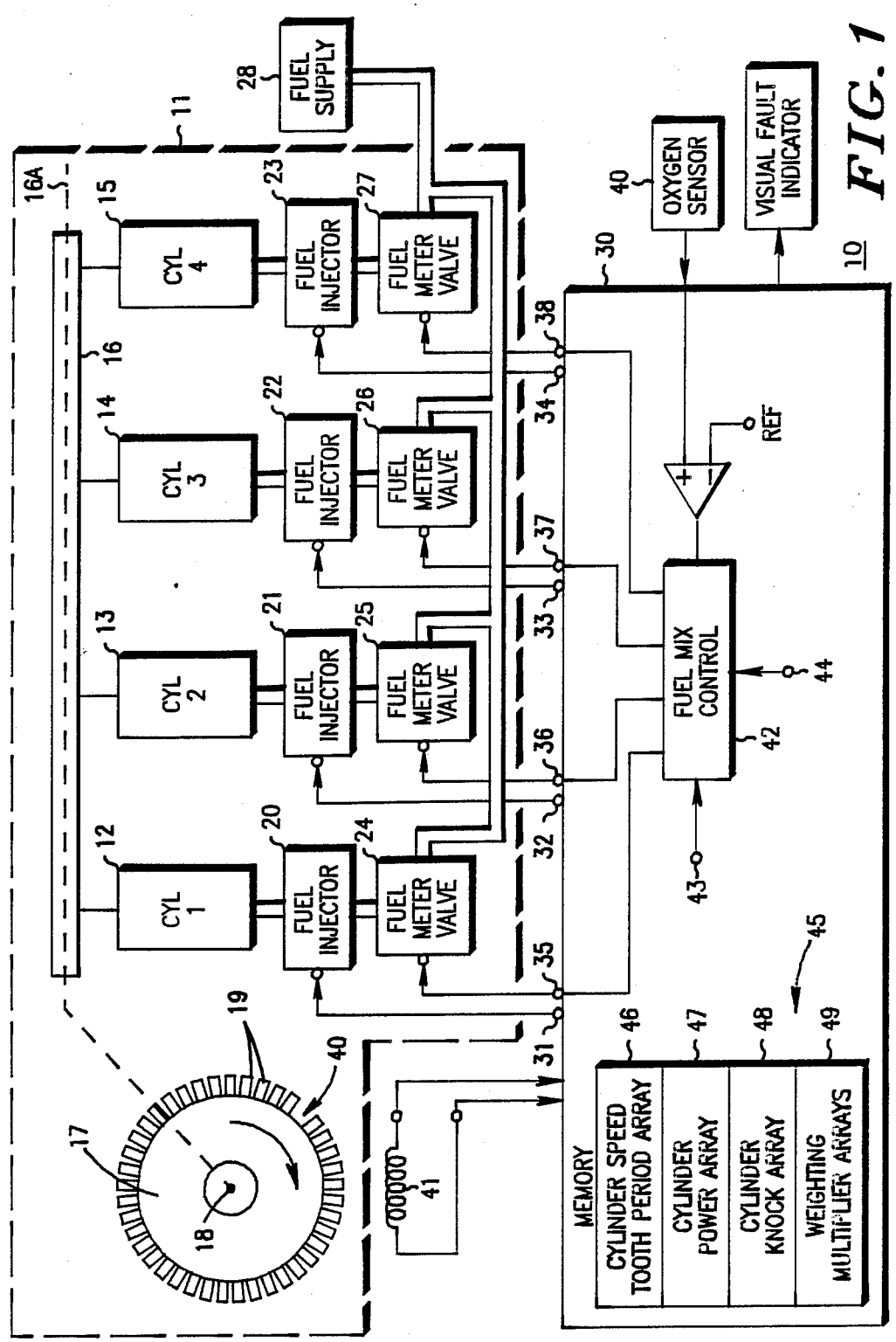
FIG. 1 is a schematic diagram illustrating an engine performance monitoring/control system constructed in accordance with the present invention.

FIG. 1 illustrates a system 10 for monitoring and/or controlling the performance of an engine 11 (shown in dashed schematic form in FIG. 1) which has four separate cylinders 12 through 15 each of which sequentially provides driving force power to rotate an engine crankshaft 16 about its axis 16A. Rotated in synchronism with the engine crankshaft 16 is a toothed wheel 17 (rotary member) 17 having a rotational axis 18 which is coincident with the rotational axis 16A of the crankshaft 16. In FIG. 1, for purposes of clarity, the toothed wheel 17 is shown separated from the crankshaft 16 and in planar rather than side view. The toothed wheel includes a number of outer peripheral teeth 19 wherein preferably there are 39 equally-spaced teeth and one missing tooth location for a total of 40 effective equally-spaced teeth. Each of the cylinders 12 through 15 essentially generates a power cycle during which fuel provided in the cylinder is compressed, and then combustion of the fuel is commenced to provide suitable rotary driving force to the crankshaft 16 and toothed wheel 17. As indicated in FIG. 1, the resultant effect is clockwise rotation of the toothed wheel 17 about the axis 18.

In FIG. 1, each of the four cylinders 12 through 15 is shown as having associated with it a fuel injector 20 through 23 and a fuel metering valve 24 through 27, respectively. A fuel supply 28, comprising a conventional engine gas tank and fuel pump, is connected to each of the fuel metering valves 24 through 27. Essentially, each of the fuel injectors 20 through 23 receives a control signal from an engine control computer 30, shown in FIG. 1, and each of the fuel metering valves 24 through 27 also receives a separate associated fuel metering control signal from the control computer 30. In response to the fuel injector control signals, which are provided by the computer 30 at terminals 31 through 34, the fuel injectors 20–23 are selectively opened to provide a premeasured amount of fuel into the associated cylinders 12 through 15. The amount of fuel being provided is determined by fuel metering control signals which are provided by the computer 30 at terminals 35 through 38 which are directly connected to control input terminals of the fuel metering valves 24 through 27. In essence, the engine control computer 30 determines how much fuel will be injected into the cylinders by separate associated fuel metering control signals, and the computer 30 determines when this fuel will be provided to the cylinders by the fuel injection signals at the terminals 31–34 which control the fuel injectors 20–23. U.S. Pat. No. 4,782,809, to Kotowski and Barylak and assigned to the same assignee as the present invention, illustrates on such system.

All of the above-described features of the present invention are conventional and well understood by those of skill in the art. The fact that one of the teeth on the toothed wheel 17 is missing indicates the occurrence of a reference cylinder top-dead-center position. Actually a missing tooth detection indicates the occurrence of top-dead-center position for one of two different cylinders because the crankshaft is rotated twice for each complete engine cycle, assuming a four stroke engine. The missing tooth detection will be combined with information from a camshaft sensor to determine top dead center for a single reference cylinder. This operation is conventional and well understood. If the engine is a two-stroke engine, additional camshaft information is not needed since the crankshaft rotates once for each complete engine cycle. The engine control computer 30 will recognize this occurrence and initialize the computer so as to establish the proper sequential injection of fuel into the cylinders 12 through 15 and the proper ignition of this fuel at a predetermined desired time for the initiation of fuel combustion. This fuel combustion can be implemented by having the fuel start combustion at a predetermined engine cylinder power cycle position due to compression of the fuel, as in a diesel engine, or by the generation of a spark occurrence signal provided by the engine control computer 30 to a spark plug (not shown) associated with each of the cylinders. In either event, the computer 30 controls when the fuel is injected and how much fuel is injected by the individual cylinder fuel control signals produced by the computer.

Two primary input signals received by the engine control computer 30 relate to (a) the precise angular rotational position of the crankshaft 16 and (b) the amount of pollutants in the exhaust provided by the engine 11. For sensing exhaust pollutants, an oxygen (O₂) sensor 40 is provided which provides an oxygen-sensing input signal to the computer 30. With regard to sensing proper angular rotational position of the crankshaft 16, which directly corresponds to predetermined power cycle positions of a piston in each of the cylinders 12 through 15, a reluctance, Hall effect or optical sensor 41 is provided which senses the passage of each of the teeth 19 on the toothed wheel. The sensor 41 produces corresponding pulses which are received by the computer 30. In general, the engine control computer will determine when the missing tooth of the toothed wheel 17 occurs and then synchronize its operation to control the sequential supplying of the fuel to the cylinders 12 through 15 in the proper sequence and at the proper time in accordance with the occurrence of the toothed wheel pulses provided by sensor 41. This type of operation, as previously described, is conventional. In addition, the engine control computer 30, in response to the level of pollutants in the exhaust, as sensed by the sensor 40, effectively compares the sensing signal provided by the sensor 40 to a reference level. The computer 30 then provides one input to what essentially comprises a fuel-mix control apparatus 42 within the engine control computer 30 that generates the fuel injection and fuel metering control signals produced by the computer.

The fuel-mix control apparatus 42 in computer 30 also will receive an additional input at a fault detection terminal 43, which input indicates whether or not knock is present in any cylinder and also indicates which cylinder knock is present at. While shown as only a single terminal in FIG. 1, obviously terminal 43 can comprise four separate terminals. Similarly, the fuel-mix control apparatus 42 receives fault information from a fault terminal 44 which indicates which, if any, of the cylinders 12 through 15 is experiencing misfire, which is defined herein as the lack of any initial fuel combustion during the expected power cycle of a cylinder. Additional inputs received by the fuel-mix control apparatus 42 relate to which if any of the cylinders 15 have low compression and which cylinders are providing more or less power to the crankshaft 16. In response to all of these inputs, including the occurrences of the toothed wheel pulses provided by sensor 41, the fuel-mix control apparatus 42 determines the appropriate amount of fuel to be provided to the cylinders 12 through 15, as well as determining the appropriate time for applying this fuel. Essentially, the fuel-mix control apparatus 42 represents the internal programming of the engine control computer 30 to implement desired system monitoring and control of the engine 11. This will be more fully explained subsequently.

FIG. 1 illustrates that within the engine control computer 30, there exists a number of different memory locations 45 for storing data which will be used by the fuel-mix control apparatus 42 in determining the amount of fuel to be provided to each of the cylinders 12 through 15. The memory 45 includes a first memory location 46 for storing an array of individual cylinder instantaneous speed/tooth period data. This data is stored as individual cylinder associated vector signals. In addition, a memory location 47 stores an array which indicates the relative power performance of each of the individual cylinders. A memory location 48 stores an array of data which is indicative of which of the cylinders is experiencing knock. A memory location 49 stores at least two different arrays, and preferably more, which essentially comprise weighting vector signals that will be used as multipliers for the speed/tooth period vector signals provided in the memory location 46. The memory 45 includes all of the locations 46-49. The manner in which the fuel-mix control apparatus 42 utilizes the data/signals stored in the memory 45 will be explained subsequently.

In addition to the structure of the engine control computer 30 shown in FIG. 1, preferably for spark ignition engines, the engine control computer 30 will also react to the tooth pulses produced by the sensor 41 and control the occurrence of spark ignition of fuel in the cylinders 12 through 15. This is in addition to the occurrence of the tooth pulses determining fuel injection occurrence. This spark control function is conventional and occurs not only in accordance with the occurrence of the tooth pulses but also in accordance with many other engine variables such as engine coolant temperature, whether or not the engine is in an idle speed mode, the sensed engine vacuum and many other engine variables. While these engine spark and fuel injection timing control functions are conventional, the significance is that the tooth position sensor 41 is already provided by most prior engine control systems to assure proper timing of control signals generated by the engine control computer 30. The present apparatus discloses an additional use of these tooth pulses (a) to detect engine knock, without the use of an additional knock sensor, (b) to detect the occurrence of many different cylinder-associated faults which may occur and to provide appropriate engine performance correction control, (c) to detect any imbalance in the amount of power provided by each of the cylinders 12 through 15 to the crankshaft 16 and take appropriate corrective action, and (d) to take such corrective action to achieve cylinder power balance while maintaining a predetermined average amount of fuel being delivered to the cylinders so as to maintain an acceptable level of engine exhaust pollutants. The manner in which this is accomplished by the present invention can best be understood by reference to the following description which further illustrates the operation of the present control/monitoring system 10.

Figure 2:
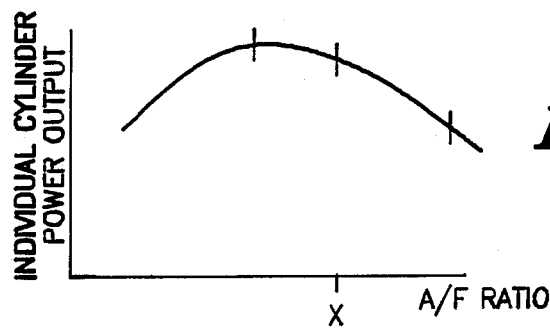
FIG. 2 is a graph showing a typical relationship between individual cylinder power output and the air fuel ratio mixture delivered to the cylinder.

Referring now to FIG. 2, a typical plot of individual engine cylinder power output versus air/fuel ratio mixture is provided. When the engine 11 is run in a normal condition, the air/fuel (A/F) ratio is maintained at a level designated as X. From the graph shown in FIG. 2, it is apparent that by adjusting the air/fuel ratio, the power produced by any individual cylinder can be adjusted to some extent. This property is what is utilized by the engine control computer 30 to adjust the cylinder power to obtain balance between the power produced by each of the cylinders 12 through 15. While providing balance between the power produced by each of the cylinders has been accomplished in other systems, it has not been accomplished in the manner suggested by the present apparatus such that either this power balancing can occur while the average amount of fuel provided to the cylinders is held constant and/or power balancing is implemented for engine operation modes other than an engine idle speed mode.

Figure 3:
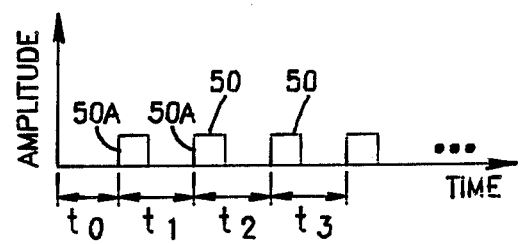
FIG. 3 is a graph illustrating toothed wheel sensor pulses produced by a portion of the system shown in FIG. 1.

Referring to FIG. 3, a typical waveform for tooth detection pulses produced by the sensor 41 is illustrated wherein the vertical axis represents amplitude and the horizontal axis represents time. Essentially, in response to the passage of each of the teeth 19, a separate pulse 50 is produced. The frequency at which these pulses 50 are produced is related to the instantaneous speed of the engine crankshaft 16 and toothed wheel 17. Thus, the time period between the occurrence of leading edges 50A of the pulses 50 is a measure of the instantaneous speed of the crankshaft 16 produced in response to the driving force provided by the cylinders 12 through 15. As is known, each of the cylinders 12 through 15 essentially has a power cycle in which (a) fuel in each of the cylinders is first compressed by movement of a piston within the cylinder, (b) initial combustion of the compressed fuel is then commenced, and (c) then during a power stroke of the piston, the cylinder provides driving force movement to the crankshaft 16. Each of the cylinders 12 through 15 has such a power cycle which, for the system 10 in FIG. 1, corresponds to the occurrence of teeth 1 through 10 for cylinder 12, teeth 11 through 20 for cylinder 13, teeth 21 through 30 for cylinder 14, and teeth 31 through 40 (the missing tooth) for cylinder 15.

Figure 4:
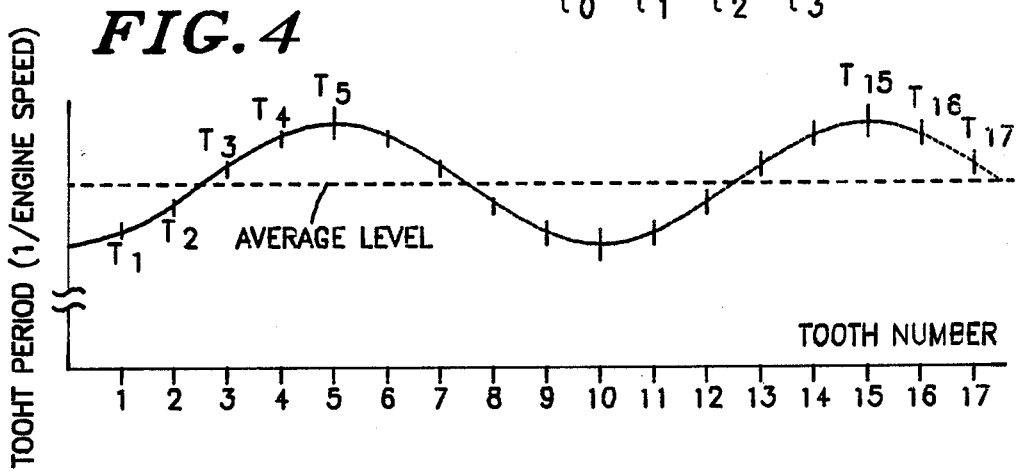
FIG. 4 is a graph illustrating the time between engine tooth pulses produced by the system shown in FIG. 1 and the occurrences of specific engine tooth pulses.

Referring now to FIG. 4, a graph representative of the instantaneous measured tooth period (time between tooth pulses 50) for the cylinders 1 and 2 is illustrated versus the time occurrence of the tooth pulses corresponding to the teeth 1 through 20. It should be noted that while the vertical axis is representative of tooth period, clearly, since the time period between tooth pulses is inversely proportional to crankshaft rotary speed, FIG. 4 is also a graph representative of the inverse of engine speed versus tooth detection occurrence.

With regard to the occurrence of the tooth detections 1 though 4, FIG. 4 illustrates that the tooth period increases between tooth detections 2 through 5, and this corresponds to the compression cycle of fuel during the cylinder 12. The detection of tooth 5 generally corresponds to the top-dead-center position of the piston in cylinder 12. As the fuel is compressed, prior to ignition or initial fuel combustion, the instantaneous speed of the crankshaft 16 is slowed since the cylinder 12 provides no driving force. It is assumed that at, or slightly before, the occurrence of the detection of tooth 5, initial combustion of the fuel in cylinder 12 will occur. This results in the tooth periods decreasing between tooth detections 5 through 10 as a result of the power being transferred from the cylinder 12 to the crankshaft 16. This corresponds to an increase in the instantaneous crankshaft speed 16. Between the tooth detections 10 through 20, the process is repeated for the second cylinder 13.

The present invention has recognized that the variations in tooth period represented by the graph in FIG. 4 correspond to a measurement of the instantaneous power produced by each of the cylinders, and that by measuring this instantaneous power, and producing a vector signal corresponding to the tooth periods shown in FIG. 4, individual instantaneous crankshaft power signals can be produced which are associated with and generated during the power cycle of each of the cylinders 12 through 15. The present invention then utilizes these instantaneous power signals to provide a number of desirable results.

Figure 5:
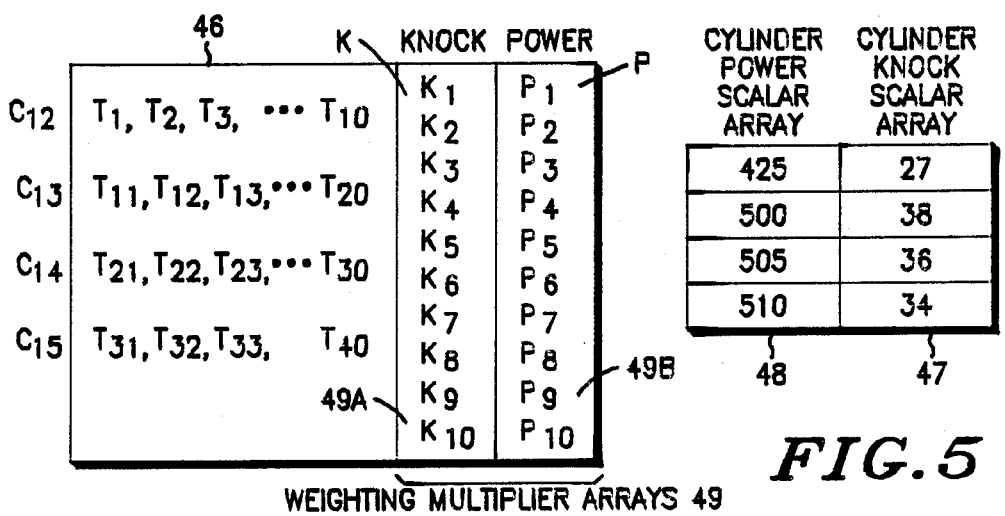
FIG. 5 is a schematic diagram illustrating individual cylinder power vector signals, arranged in an array, along with knock and power weighting vector signals also arranged in an array, FIG. 5 also illustrates the product scalar signals, arranged in arrays, which result from multiplying the power and weighting vector signals.

Referring to FIG. 5, the contents of the memory 45 in the engine control computer 30 is illustrated in general form. In the memory location 46, it was stated that an array of cylinder-associated speed/tooth period data was contained. As seen in FIG. 5, each of the cylinders 12 through 15, is represented by an associated vector signal (C12 to C15) comprising one of the rows C12 to C15 in FIG. 5 which make up a four-by-ten array in memory location 46. The rows/vector signals C12 to C15 comprise, respectively, the tooth periods $T_1$ through $T_{10}$ for cylinder 12, $T_{11}$ through $T_{20}$ for cylinder 13, $T_{21}$ through $T_{30}$ for cylinder 14, and $T_{31}$ through $T_{40}$ for cylinder 15. The composite four-by-ten array in location 46 comprises the tooth periods which exist during the power cycle of each of the cylinders. Each of the vector signals C12 to C15 is actually a measure of the instantaneous power attributable to each of the cylinders 12-15, respectively, due to its power (compression and fuel combustion) cycle. The memory location 49 was stated to contain arrays of vector-weighting multiplier signals. In FIG. 5, a knock-weighting signal K is stored in memory location 49A as a column of weighting signals $K_1$-$K_{10}$ associated with the ten tooth periods sampled for each of the cylinders 12 through 15. Similarly, a power-weighting vector signal P is stored in location 49B as a column of weighting multipliers $P_1$-$P_{10}$ for the ten sampled tooth periods. The locations 49A and 49B make up memory location 49.

It is contemplated that the instantaneous power signal for cylinder 12, which signal in FIG. 5 corresponds to row/vector signal C12, will be multiplied by the knock-weighting multiplier vector K. The multiplication of these two vector signals results, as is known in the mathematics art, in a scalar product signal corresponding to cylinder 12. The scalar product signal is $T_1K_1+T_2K_2 \ldots +T_{10}K_{10}$. Scalar product signals are also formed corresponding to cylinders 13, 14 and 15. Memory location 47 stores a column array of these resultant scalar product signals wherein typical numerical values have been inserted into this array in FIG. 5.

It is contemplated that the knock-weighting multipliers $K_1$ through $K_{10}$ are selected to provide the appropriate weight to the tooth periods such that any excessively large or small scalar number in the array 47 will be indicative of the presence of knock in an associated one of the cylinders 1 through 4. This can be achieved by comparing each of the knock-related scalar numbers in array 47 either to a predetermined reference level or to another one of the knock-related scalar numbers in array 47, or both. Similarly, the power-weighting multiplier vector signal P, when multiplied by the array of the cylinder tooth-period signals C12 through C15, results in a cylinder power scalar array stored in column form in the memory location 48. Again, the typical numbers are inserted in FIG. 5, with such numbers indicative of the relative power being transferred to the crankshaft 16 by each of the cylinders.

The preferred manner and sequence in which the multiplication of the instantaneous power output vector signals C12 through C15 by the weighting multiplier vector signals K and P will be described subsequently in connection with the flow charts illustrated in FIGS. 6 and 7. These flow charts also illustrate how the present system utilizes this information to adjust the fuel being delivered to each of the cylinders so as to implement power balancing between the cylinders, and how the present system corrects individual cylinders with respect to detected faults and/or provides an indication of the existence of such faults. FIGS. 8A through 8C illustrate tooth-period variations corresponding to those shown in FIG. 4, but wherein these tooth period variations exist for various types of different faults to be detected by the present system.

Figure 6A:
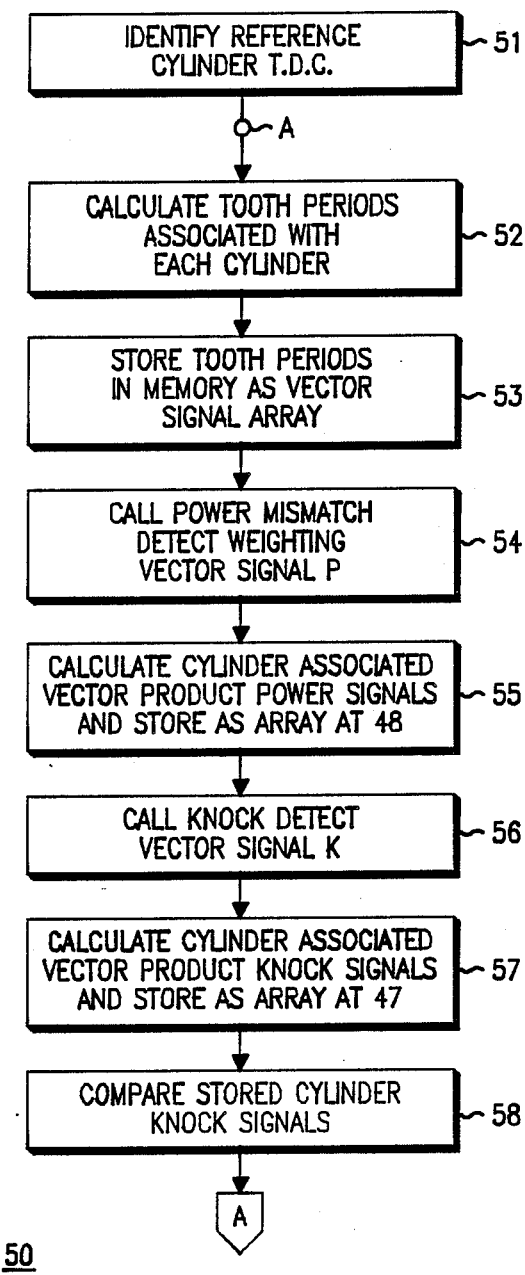
FIGS. 6a, 6b and 7 are schematic diagrams illustrating flow charts representative of the operation of the monitoring/control system shown in FIG. 1.
Figure 6B:
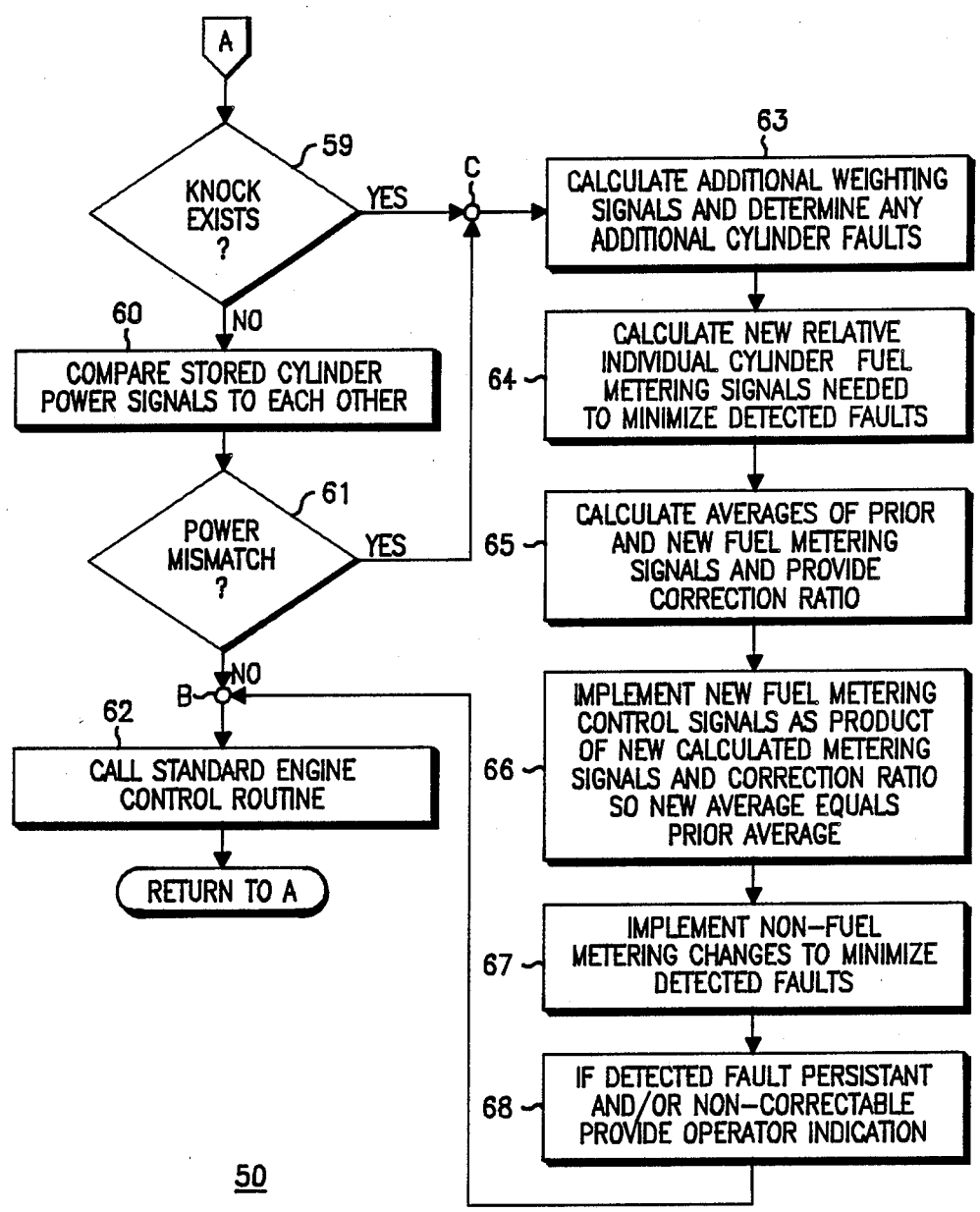

Referring now to FIGS. 6a and 6b, a flow chart 50 for the engine control computer 30 is illustrated. The flow chart commences at a step 51 at which an identification of a reference cylinder top-dead-center position is implemented. This corresponds to the computer 30 detecting the occurrence of the missing tooth 40 of the toothed wheel 17 which corresponds to a top-dead-center (TDC) piston position for one of the four cylinders 12 through 15. This assumes, for a four-stroke engine, that the computer 30 also receives additional camshaft sensor information. The identification of TDC for the reference cylinder results in initializing the sequential operation of the engine control computer 30 so that fuel and spark will be provided to the various cylinders at the proper times.

From process block 51, control passes to a summing terminal A and then on to a process block 52 during which the computer 30 calculates the tooth periods between the occurrence of tooth pulses associated with each of the cylinders. This essentially corresponds to the computer 30 measuring the time durations between the occurrence of each of the teeth 1 through 40 and creating the tooth-period vector signals to be stored, as an array, in memory location 46 in FIG. 5. This storage in the memory location 46 is achieved by a next process block 53. Then, a process block 54 calls up a desired (and in this case a preferred powered mismatch detection) stored weighting column vector signal P. This corresponds to the computer 30 calling up the weighting vector signal P for use by a subsequent process block 55 which will multiply the vector signal P by each of the vector signals $C_{12}$ through $C_{15}$ to form scalar power transfer product signals associated with each of the four cylinders. These are stored as an array, also per the process block 55, in the memory location 48 indicated in FIG. 5. Then, process block 56 calls another weighting column vector signal K related to the detection of knock, and a subsequent process block 57 results in creating the scalar cylinder knock product signals stored in memory location 47 shown in FIG. 5.

It should be noted that when multiplying the vector signal $C_1$ by a vector weighting, such as P, for example, this results in essentially the pairing up of the products $T_1P_1$, $T_2P_2$, $T_3P_3$, etc. Then, these products are summed to provide the scalar product signal corresponding to cylinder 12 which is stored in one of four memory locations comprising memory location 48. Thus, after the process step 57 of the flow chart 50, all of the information in the memory locations 45, generally as indicated in FIG. 5, has been created and placed into the appropriate memory locations.

After the process step 57, the computer 30 implements a process step 58 in which each of the cylinder-associated scalar product signals stored in the memory location 47 is compared to either a predetermined reference level or to each other. By selection of an appropriate weighting multiplier signal K, the existence of knock in any one of the cylinders 12 through 15 can be determined by whether or not the scalar signal (number) associated with a cylinder in the memory location 47 is above or below a predetermined threshold level indicative of knock. This is because, as will be explained with regard to the graphs in FIGS. 8A–8C, the existence of engine knock in any one cylinder has a pronounced effect on the between-tooth-time periods produced in association with that cylinder such that, by noting abrupt increases or decreases in between-tooth-time periods after an expected firing for a cylinder, it is possible to determine if knock exists. The weighting signal K emphasizes tooth periods near expected initial fuel combustion in a cylinder over tooth periods at other times.

A determination of engine knock is represented by a decision block 59. If the decision block 59 determines that knock has not been detected in any of the cylinders, then the flow chart 50 continues to process block 60 which provides a similar comparison of the signals stored in the power output scalar array in memory 48. However, now in accordance with process block 60, the signals (scalar numbers) stored in memory 48 are not each compared to a predetermined reference level, but are compared to one another. This comparison of the output power of one cylinder to the output power of another cylinder eliminates the need for knowing how much power a specific cylinder is expected to generate. In addition, it is not necessary to know what the desired engine crankshaft speed is, so the present system can be operative in modes other than the engine idle speed mode where the resultant desired engine speed is known. By comparing the individual cylinder scalar power numbers in memory 48 to one another, it can be determined if there is a power mismatch between the various cylinders, and this is represented by a decision block 61. If no power mismatch has been determined, because the scalar numbers do not sufficiently differ from one another by a predetermined threshold amount, then control passes to a summing terminal B and then on to a standard engine control subroutine 62 which implements control of fuel injection and spark ignition in accordance with the parameters of the engine 11. Subsequently, control passes from the process block 62 back to the summing terminal A for the next calculation of time periods between each of the detected teeth 1 through 40.

If decision block 59 determines that knock exists for any of the cylinders or decision block 61 determines that a power mismatch exists, control passes to a summing terminal C. After this summing terminal C, control passes to a process block 63 during which it is contemplated that the computer 30 will now call up numerous other weighting vector signals stored in additional portions of the memory 49 to essentially determine all possible cylinder faults which may exist. It should be noted that even without the process block 63, the present invention has already provided for determining two different types of cylinder faults, the existence of knock or a power mismatch, by use of the same instantaneous power output signals $C_{12}$ through $C_{15}$ contemplated by the present system 10. Thus, one advantageous feature of the present embodiment is that different individual cylinder faults can be determined by using the same instantaneous power output signals $C_{12}$–$C_{15}$ and merely calling up different weighting vector signals for appropriate multiplication with regard to the power output vector signals in memory location 46. Thus, when generating a scalar signal (number) related to knock, it may be desirable to heavily weight the between-teeth periods which occur immediately prior to and after an expected initial occurrence of fuel combustion, which in FIG. 4 is assumed to occur at the fifth and fifteenth tooth corresponding to the firing indications of $F_1$ and $F_2$ for the cylinders 12 and 13. However, when determining the total amount of power transferred from one cylinder to the crankshaft, it may be more significant to more heavily weight the tooth periods occurring somewhat after the firings $F_1$ and $F_2$ such as the tooth periods $T_7$ and $T_8$ and $T_{17}$ and $T_{18}$, as well as the amount of change between these tooth periods to get a proper, more accurate measurement of the amount of power being generated by each cylinder.

The process block 63 has now determined all of the possible cylinder faults which may exist by calling up various other weighting vector signals for multiplication with regard to the instantaneous cylinder power output vector signals $C_{12}$ through $C_{15}$. The process flow then proceeds to process block 64 which is indicative of the engine control computer 30 calculating new fuel metering control signals needed to take corrective action. This involves having the fuel mix control apparatus 42 calculate new fuel metering control signals to be applied at the terminals 35 through 38 to provide for adjusting the amount of fuel being provided to each of the cylinders 12 through 15. These signals have relative magnitudes that would be needed so as to achieve cylinder power balance by adjusting each cylinder's power so that it more closely matches that of other cylinders. The amount of adjustment needed for the fuel metering signals is determined by relative comparison of the cylinder power performance signals (numbers) in memory location 48. The cylinder power characteristic in FIG. 2 indicates how adjusting cylinder fuel can be used to adjust cylinder power output. Thus cylinders providing either too much or too little power will have new fuel metering signals calculated so as to achieve power balance. In addition, process block 64 may also try to adjust cylinder power by altering the spark timing for the ignition of fuel in the cylinders 12 through 15 if the engine 11 is a non-diesel engine.

However, prior to implementing any new fuel metering signals at terminals 35-38, control passes from block 64 to block 65 which calculates the average (Anew) of the new fuel metering control signals and the average (Aold) of the old (prior) fuel metering control signals at the terminals 35-38. Block 65 creates a correction factor (CF) equal to the ratio of the old average to the new average: CF=Aold/Anew. Then control passes to process block 66 which implements new fuel metering control signals at the terminals 35-38 wherein each new fuel metering signal is the product of the desired calculated fuel metering signal for a cylinder and the correction factor CF. In this manner the average of the new fuel metering control signals at terminals 35-38 will equal the old average Aold. Thus, while block 66 achieves a power balance correction, the average fuel delivered to all of the cylinders is not changed. This is significant since the level of pollutants in the engine exhaust is a function of the average amount of fuel delivered to the cylinders. As shown in FIG. 7, this average fuel level is controlled to insure minimum pollutants. A feature of the present embodiment is that this pollution control will be maintained while also implementing power balancing. Other power balancing systems did not insure that the pollution level did not change as a function of power balancing.

The process block 67 represents taking corrective action, other than changes in fuel metering, in response to specific detected engine cylinder faults by modifying engine control signals. It is contemplated that if the present system identifies a cylinder as having a power mismatch, and no other faults exist, then this results in process blocks 64-66 generating a new set of fuel metering control signals at the terminals 35 through 38. If the present invention determines that knock exists, and no other fault exists, then, for a non-diesel engine, corrective action such as altering the occurrence of spark ignition, either on a cylinder-by-cylinder basis or as a uniform adjustment to all spark timing, can be implemented, as it is conventionally done, to avoid the occurrence of knock. Process block 67 corresponds to such a non-fuel metering signal correction.

Control passes from block 67 to process block 68 which essentially inquires if the detected fault has been persistently detected in the past and/or if the detected fault is a non-correctable fault by the system 10. In case a detected fault indicates that one of the cylinders is not firing and has not fired within the last twenty expected firings, this can be indicative of a broken spark plug wire or a clogged fuel port. In such a case, the engine control computer 30 should provide a visual fault indication to the operator of the engine indicating the existence of this fault, which cylinder is at fault, and what type of fault has been detected. All of this information is available by comparison of the different scalar numbers produced by selecting the appropriate weighting vector signals and multiplying them by the vector signals in $C_{12}$ through $C_{15}$ indicative of individual cylinder instantaneous power. Thus, the process block 68 will provide an appropriate visual fault indication. Preferably this is achieved via a visual fault indicator such as the apparatus 66 shown in FIG. 1. Control then passes to the summing terminal B and then on to the standard engine control routine 62.

Figure 7:
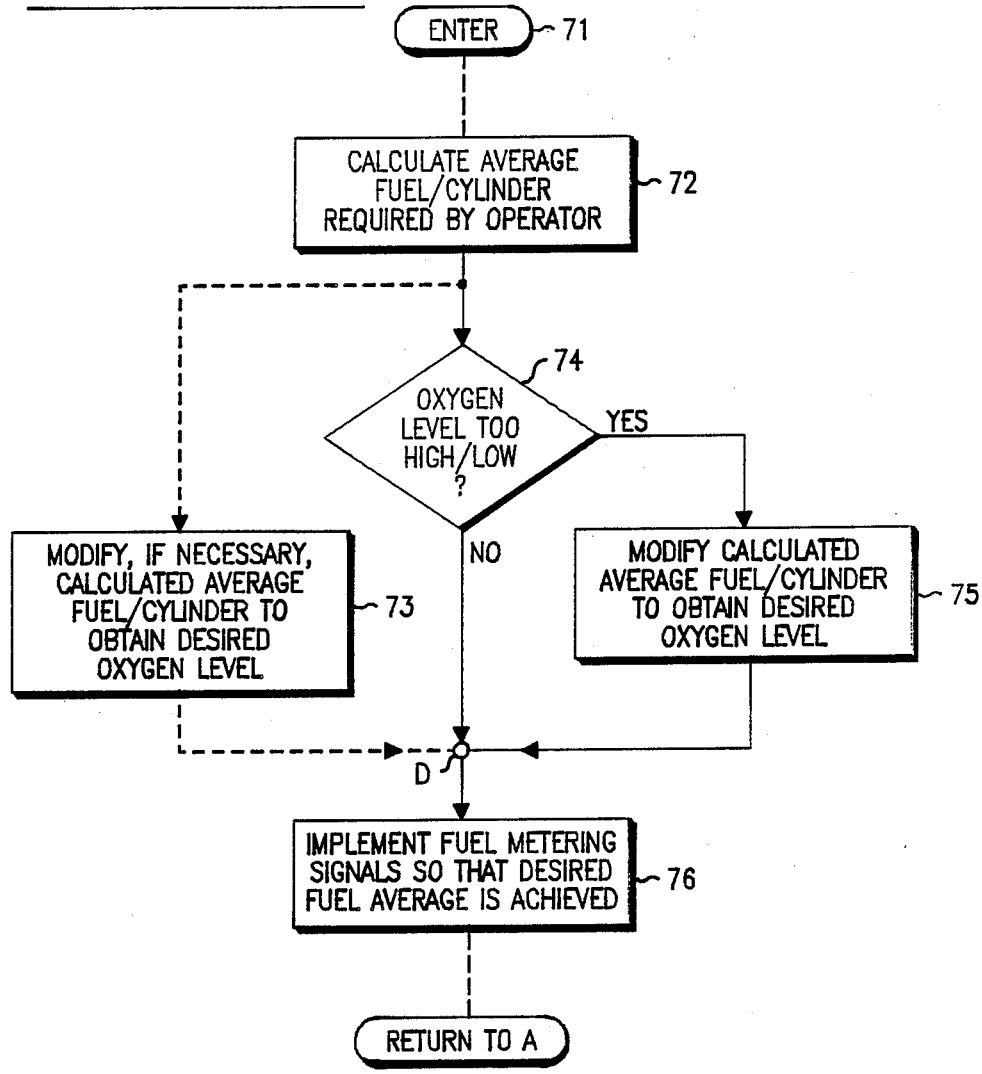
Figure 8A:
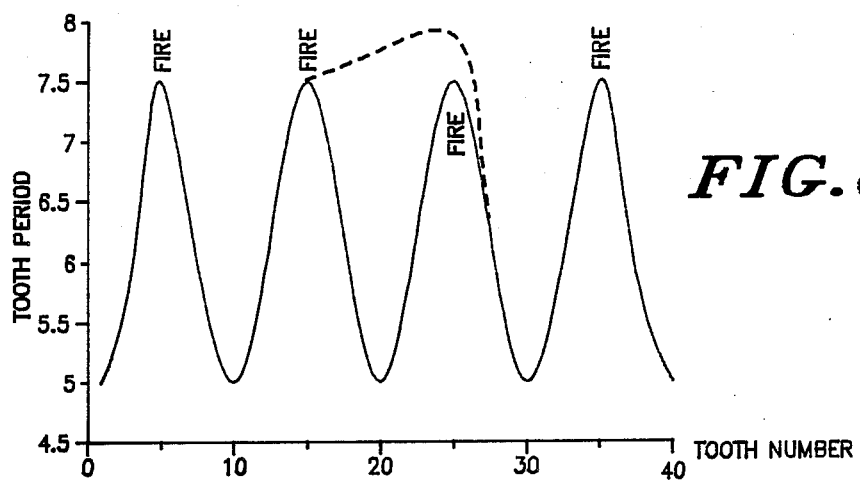
FIGS. 8A–8C comprise three graphs which illustrate variations in tooth period as a function of the occurrence of a specific tooth pulse for both normal operation and three different types of cylinder performance faults which can be detected by the present invention.
Figure 8B:
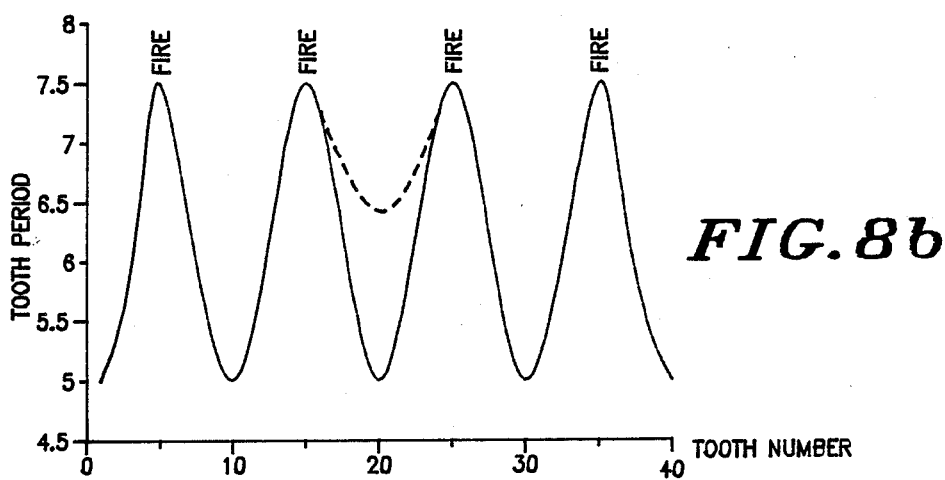
Figure 8C:
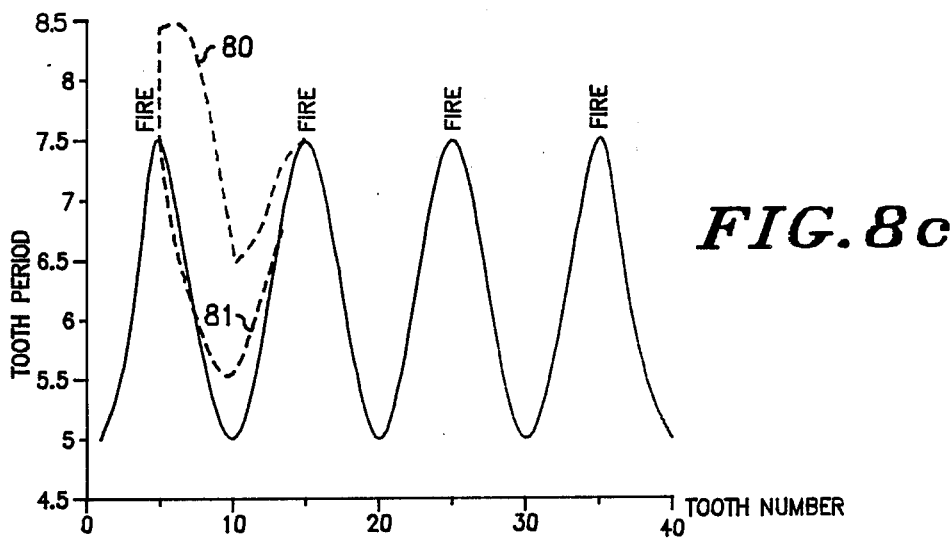

FIG. 7 essentially illustrates a flow chart 70 representative of the standard engine control routine 62. The chart is entered at an entry location 71 and, after a number of steps not shown in FIG. 7, arrives at a process block 72 in which the amount of average fuel to be delivered to each cylinder is calculated in accordance with a predetermined engine criteria such as the amount of depression of the throttle of the engine by the engine operator. Then, the process flow may take either of two different paths. A dashed one of these paths comprise the process block 73 connected between the block 72 and a summing terminal D. The process block 73, if necessary, essentially modifies the calculated average amount of fuel required per cylinder (calculated by block 72) to obtain a desired oxygen-sensing level in the engine exhaust. This is the conventional manner of controlling pollutants in the engine exhaust by sensing the oxygen level in the exhaust and controlling average fuel in accordance therewith. Alternatively, the process flow between 72 and D may comprise a decision block 74 which determines if the oxygen level is too high/low at the present time. If the answer is yes, then process flow continues to block 75 which modifies the pre-existing calculated required average fuel per cylinder (calculated by block 72) so as to reduce the contaminant level sensed by the oxygen sensor. Then control again returns to the summing terminal D. Essentially, blocks 74 and 75 set up a pollution threshold before modifying the calculated average fuel, wherein this threshold is inherent in block 73.

From terminal D, control passes to a process block 76 which implements a new average fuel level for the engine in accordance with blocks 72 and/or 73 or 74-75. The easiest way of doing this is to determine the prior average fuel being delivered and use the new desired average fuel to create a multiplication factor for the fuel metering signals at terminals 35-38. This modifies the average fuel delivery as desired, without changing the relative proportion of fuel delivered to each cylinder. Thus, cylinder balance is maintained, even though average fuel is adjusted. After block 76, some other process steps may be present, and then the flow chart 70 will return to summing terminal A in the flow chart 50 in FIG. 6 to resume operation.

A key feature of the flow chart 70 is that process block 76 will essentially provide a servo control loop in which the amount of pollutants in the exhaust will control the average amount of fuel delivered to the engine. If cylinder balancing is also to be achieved, then this cylinder balancing will be implemented by process blocks 64–66. These process blocks calculate new fuel metering signals so as to achieve cylinder balance, and then alter the magnitude of all of these calculated signals in accordance with the ratio between the previous average of the pre-existing cylinder fuel metering signals and the average of the newly-calculated fuel metering signals. Thus, the average fuel per cylinder will be delivered at the level indicated by the pollution sensing servo control loop in FIG. 7, but the fuel delivered to each individual cylinder will be balanced in accordance with the power mismatch data indicated in the array stored in memory location 48.

Referring to FIGS. 8A through 8C, these FIGS. indicate typical graphs of tooth period versus tooth detection occurrence. In dashed form in FIG. 8A, superimposed upon the normal waveform, is the expected variation of tooth period when there is no ignition of fuel at the expected fuel ignition point corresponding to the occurrence of tooth 15. This is indicative of a misfire or lack of firing of the cylinder corresponding to cylinder 13. In such a case, the tooth period will continue to lengthen for tooth periods 16 through 25, rather than decrease, as expected, due to a speeding up of the crankshaft.

FIG. 8B indicates, in dashed form, the waveform for a condition of a weak cylinder being detected for the engine cylinder corresponding to cylinder 13. In this situation, the amount of power produced by cylinder 13 is not typical. Therefore, the amount of increase in tooth period after the expected firing at tooth 15 is not as pronounced as it is for all of the other cylinders. In other words, there is a slower-than-normal increase after an expected ignition firing, and this correlates to a weak cylinder fault condition. This conclusion is certainly true when each cylinder receives approximately the same amount of fuel.

FIG. 8C illustrates two dashed waveforms 80 and 81 both of which can be indicative of the condition of engine knock in cylinder 12. In waveform 80, an abrupt unexpected lengthening of tooth period occurs for cylinder 12 at the expected firing time around the occurrence of tooth 5. This is indicative of combustion of fuel occurring too soon in the engine compression cycle. After tooth 5, the tooth period will now decrease because now the inertia of the engine takes over and any remaining power thrust in the cylinder is now directed in the proper direction. Curve 81 illustrates engine knock which exists because fuel combustion has occurred too late in the cylinder power cycle such that a larger and more abrupt than normal rate of increase in tooth period is achieved between the occurrence of teeth 5 and 8. This again is a condition to be avoided and is indicative of engine knock.

The present invention contemplates selecting one or more knock and other fault detection weighting vector signals for multiplication by the cylinder power (tooth period) vector signals $C_{12}$–$C_{15}$. This will enable use of the tooth period signal to detect engine knock and other faults by detecting differences in the cylinder tooth period signals. For detecting engine knock, this involves detecting when the rate of change of the tooth period signal exceeds either a maximum or minimum rate of change just after expected initial fuel combustion or just after top-dead-center piston position. Thus, when the knock scalar signals in memory location 47 are above or below some maximum and minimum thresholds, this would indicate knock and indicate which cylinders knock is occurring in. These threshold levels are measured with respect to a reference level, which may be determined by the knock scalar signals.

While we have shown and described specific embodiments of this invention, further modifications and improvements will occur to those skilled in the art. All such modifications, such as expanding the present system to six or eight cylinders, which retain the basic underlying principles disclosed and claimed herein are within the scope of this invention.

We claim:

1. For an engine having multiple separate cylinders each intended for sequentially providing, during a cylinder-associated power cycle separate from the power cycles associated with other cylinders, a driving force to common driven mechanical member, a system for monitoring and/or controlling engine performance comprising:

means for developing separate power output signals for each of said cylinders, each of said power output signals representative of and associated with the driving force provided by an associated cylinder to the driven member and having a magnitude indicative of such provided driving force attributable to said associated cylinder, said magnitude varying over the associated power output cycle;

first means for multiplying each of said power output signals by a first weighting factor to obtain a first product signal, associated with each cylinder, representative of each cylinder's performance over its associated power cycle;

first means for comparing each of said cylinder-associated first product signals to a selected reference level to determine each cylinder's performance with respect to a first performance criteria;

second means for multiplying each of said power output signals by a second weighting factor, different from said first weighting factor, to obtain a second product signal, associated with each cylinder, representative of each cylinder's performance over its associated power cycle; and second means for comparing each of said cylinder-associated second product signals to a second selected reference level to determine each cylinder's performance with respect to a second performance criteria different from said first performance criteria;

whereby the same output power signals associated with each cylinder are used for the monitoring of two different performance criteria of said cylinders.

2. A system according to claim 1 wherein each of said power output signals comprises a power vector signal having discrete magnitudes over the power cycle indicative of the variation in cylinder power transferred to the driven member over the power cycle.

3. A system according to claim 2 wherein each of the first and second weighting factors comprise a vector signal and wherein each of said multiplying means includes means for multiplying the power vector signals and weighting vector signals to provide scalar signals associated with each of the cylinders, respectively, said first and second product signals comprising said scalar signals produced by said first and second multiplying means.

4. A system according to claim 3 wherein said means for developing said power output signals comprises a toothed wheel and an associated sensor and wherein said power vector signals comprise an array of magnitude values indicative of the time periods between the occurrence of tooth detections by said sensor.

5. A system according to claim 1 wherein said first and second performance criteria correspond to different cylinder fault conditions which may occur and wherein said system includes means for adjusting cylinder performance in response to said comparison means detecting the existence of said cylinder fault conditions.

6. A system according to claim 1 wherein said system includes means for controlling the amount of fuel provided to each of said cylinders in accordance with the performance of said cylinder as measured by at least one of said first and second comparison means.

7. For an engine having multiple separate cylinders each sequentially providing a driving force to a common mechanical member, a system for controlling engine performance comprising:
   means for delivering a predetermined average amount of fuel to all of said cylinders in accordance with at least a predetermined criteria;
   means for monitoring individual cylinder power performance and developing associated cylinder power performance signals indicative of each cylinder's performance in developing power to be transferred to said member;
   means for correcting the amount of fuel delivered to each cylinder, which is determined by cylinder-associated fuel metering control signals, in accordance with said cylinder-associated power performance signals, such that each cylinder's performance is balanced (adjusted) with respect to other cylinders so that each cylinder's performance more closely matches that of another cylinder; and
   means for maintaining the average amount of fuel delivered to all of said cylinders at said predetermined average amount while cylinder power balancing is achieved by said correcting means.

8. A system according to claim 7 which includes an engine pollutant sensor for sensing the amount of pollutants in engine exhaust and wherein said engine pollutant sensor determines said predetermined criteria used by said fuel delivering means to determine the predetermined average of fuel being delivered to said cylinders.

9. A system according to claim 8 wherein said maintaining means includes means for effectively calculating the average of existing fuel metering control signals prior to said correction means implementing any additional fuel correction of such control signals, said correction means using this existing average, as well as said cylinder-associated power performance signals, to calculate new fuel metering control signals such that the average of such new fuel metering control signals will match the average of the previous fuel metering control signals.

10. A system according to claim 7 wherein said maintaining means includes means for effectively calculating the average of existing fuel metering control signals prior to said correction means implementing any additional fuel correction of such control signals, said correction means using this existing average, as well as said cylinder-associated power performance signals, to calculate new fuel metering control signals such that the average of such new fuel metering control signals will match the average of the previous fuel metering control signals.

11. For an engine having multiple separate cylinders each sequentially providing a driving force to a common mechanical member, a system for controlling engine performance comprising:
   means for monitoring individual cylinder power performance in developing associated cylinder power performance signals indicative of each cylinder's performance in developing power to be transferred to said member; and
   means for correcting the amount of fuel delivered to each individual cylinder, which is determined by cylinder-associated fuel metering control signals, in accordance with said power performance signals, such that each cylinder's performance is balanced (adjusted) with respect to other cylinders so that each cylinder's power performance more closely matches that of another cylinder;
   wherein said correcting means achieves cylinder balance by comparing the power performance signal of a first cylinder to the power performance signal of a second cylinder and determining said fuel metering control signals for said first and second cylinders in accordance with the difference between said compared power performance signals,
   means for delivering a predetermined average amount of fuel to all of said cylinders in accordance with a predetermined criteria, and
   means for maintaining the average amount of fuel delivered to all of said cylinders at said predetermined average amount while cylinder power balancing is achieved by said correcting means.

12. A system according to claim 11 wherein said maintaining means includes means for effectively calculating the average of existing fuel metering control signals prior to said correction means implementing any additional fuel correction of such control signals, said correction means using this existing average, as well as said cylinder-associated performance signals, to calculate new fuel metering control signals such that the average of such new fuel metering control signals will match the average of the previous fuel metering control signals.

13. For an engine having multiple separate cylinders each sequentially providing a driving force to a common mechanical member, a system for monitoring and/or controlling engine performance comprising:
   sensor means for monitoring the position of said driven member and developing a speed-indicative signal indicative of and varying in accordance with the speed at which said driven member is driven by said multiple cylinders;
   means for monitoring a predetermined portion of said speed-indicative signal, said monitored portion generated in association with and during an expected power cycle produced by a first one of said cylinders and prior to an expected next sequential power cycle of another one of said cylinders; and means for developing a signal indicative of the occurrence of knock in said first one of said cylinders by determining when variations of said monitored portion of said speed-indicative signal match expected variations of said monitored speed-indicative signal which exist when knock in said first cylinder is present.

14. A system according to claim 13 wherein said knock signal developing means includes means for determining when the rate of change of said speed-indicative signal during said monitored portion exceeds a predetermined threshold rate of change reference level.

15. A system according to claim 14 wherein said knock signal developing means includes means for measuring the rate of change of said speed-indicative signal at least at a time, during said monitored portion, generally corresponding to the time after which initial combustion of fuel in said first one of said cylinders is expected and comparing said measured rate of change with said reference level.

16. A system according to claim 15 wherein said rate of change reference level comprises both a maximum rate of change level and a minimum rate of change level, said knock-indicative signal being produced by said developing means whenever the rate of change of said speed-indicative signal measured at said time is outside of the rate of change range defined between said maximum and minimum rates of change.

17. A system according to claim 14 wherein said rate of change reference level comprises at least a maximum rate of speed-increase level which the rate of change of said speed-indicative signal during said monitored portion should not exceed after the occurrence of top-dead-center power cycle position for said first cylinder, said monitoring means determining said rate of change of said speed-indicative signal for comparison to said reference level after said top-dead center cylinder cycle position of said first cylinder.

18. A system according to claim 13 wherein said power cycle, during which said monitoring means monitors said speed-indicative signal, includes fuel compression and subsequent fuel combustion which takes place in said first cylinder.

19. A system according to claim 13 wherein said driven member corresponds to a rotationally-driven wheel and wherein said sensor means includes means for providing pulses whose time occurrence indicates the occurrence of predetermined rotational positions of said wheel.

20. A system according to claim 19 wherein said knock-indicative signal developing means includes means for measuring the time period between pulse occurrences for the pulses provided by said sensor means during said monitored portion of said speed-indicative signal and noting differences between expected time periods between such pulses and actual measured time periods.

21. A system according to claim 20 wherein said knock-signal developing means includes means for creating a speed vector signal having discrete magnitudes corresponding to the time periods between pulse occurrences which occur during said monitored portion of said speed-indicative signal, said vector signal time periods varying as a function of the power cycle of said first cylinder.

22. A system according to claim 21 wherein said knock-signal developing means includes providing a first weighting vector signal comprising an array of multiplication factors, said knock-signal developing means including multiplying means for multiplying said speed vector signal by said first weighting vector signal to provide a resultant scalar product signal associated with said first cylinder, the magnitude of said scalar product signal with respect to a predetermined reference level, indicative of whether knock is present in said first cylinder.

* * * * *